June 2, 1964 KEIZO SHIMANO 3,135,368
BICYCLE HUB HAVING A BUILT-IN TWO-STAGE SPEED CHANGE MECHANISM
Filed March 6, 1962 2 Sheets-Sheet 2
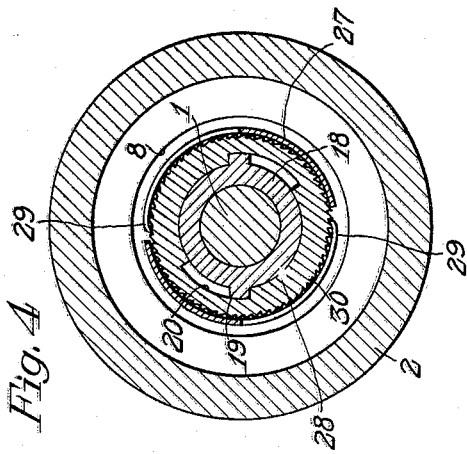
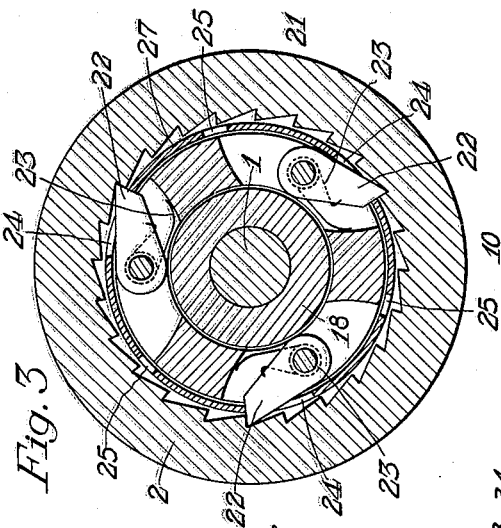
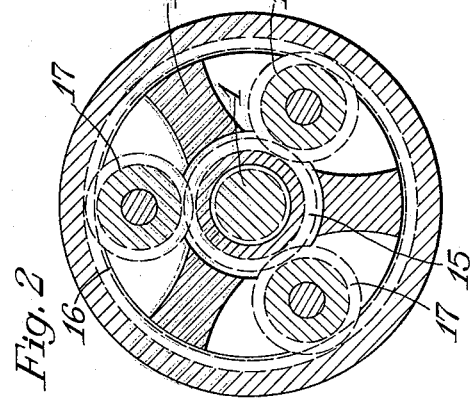
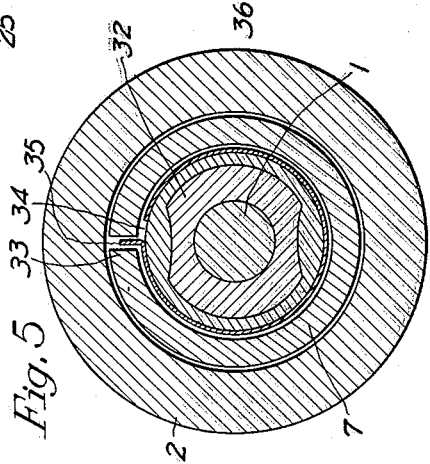
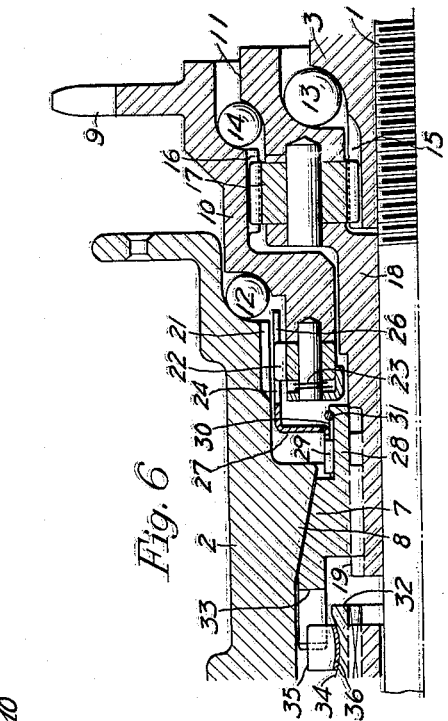

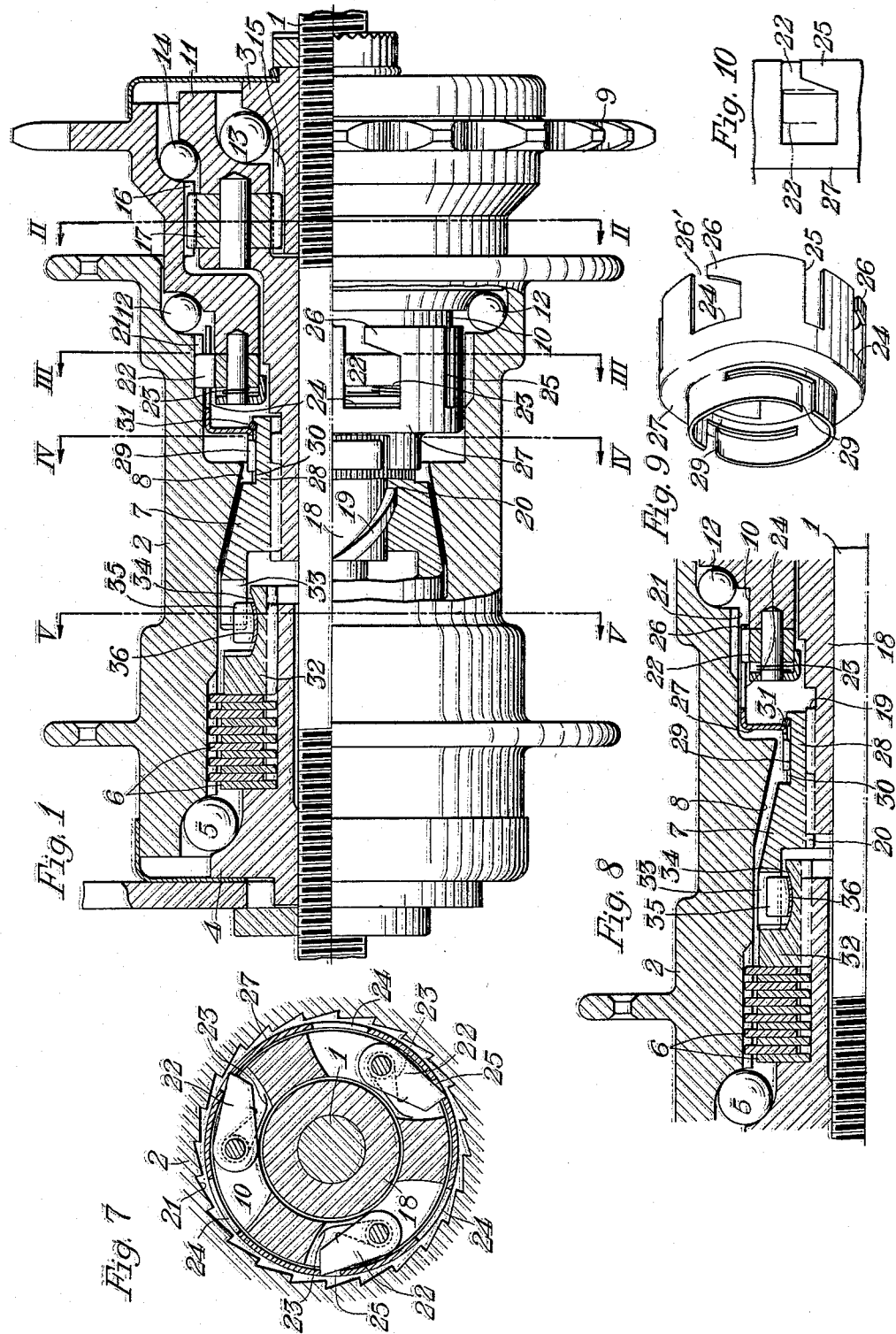

United States Patent Office 3,135,368
Patented June 2, 1964

3,135,368
BICYCLE HUB HAVING A BUILT-IN TWO-STAGE SPEED CHANGE MECHANISM
Keizo Shimano, 81 Midorigaoka-Minamicho 3-chome, Sakai, Japan
Filed Mar. 6, 1962, Ser. No. 177,873
Claims priority, application Japan Nov. 25, 1961
2 Claims. (Cl. 192—6)

This invention relates to a bicycle hub having a built-in two-stage speed change mechanism, including a coaster brake. According to this invention a special power transmission mechanism is arranged in a space within a hub shell, in which not only the normal high speed is obtainable, but also a lower speed may be obtained by rotating a sprocket wheel in reversed direction for a limited angle insufficient for actuating the coaster brake. The invention has for its object to provide an improved speed change mechanism which is simple in construction and is reliable in operation without increasing the size of the hub. Other and further objects of the invention will be obvious upon an understanding of the illustrative embodiment about to be described.

The accompanying drawing will serve to illustrate a specific embodiment of my invention, in order that its utility and functioning will be thoroughly appreciated. It will be understood, however, that this is by way of illustration only and is not to be taken as limiting the invention in any way. In the drawing:

FIGURE 1 shows a rear elevation, partly in section, a bicycle hub having a built-in two-stage speed change mechanism constructed according to this invention;

FIGURES 2 to 5 are cross sectional views taken along lines II—II, III—III, IV—IV and V—V, respectively, of FIGURE 1;

FIGURE 6 is a sectional view of the parts in the right hand half of FIGURE 1, but showing the low speed position of the mechanism;

FIGURE 7 shows a cross sectional view of FIGURE 6;

FIGURE 8 shows a longitudinal sectional view of a portion of FIGURE 1 when the brake is operated;

FIGURE 9 shows a perspective view of a pawl shifter cage; and

FIGURE 10 shows a detail, in plan view, a part of said shifter cage.

Referring to the drawing, the reference numeral 1 designates a rear fixed or dead axle of a bicycle having a right hand hub cone 3 and a left hand hub cone 4, on which a hub shell 2 is journalled through ball bearings comprising bearing balls 5, 12, 13 and 14. Within the hub shell 2 there are a plurality of brake discs 6 associated with a clutch cone sleeve 7. This cone sleeve 7 is adapted to be axially slidable to co-operate with a tapered clutch face 8 provided on the inner wall of the hub shell 2. 9 is a sprocket wheel which is so associated with said clutch cone sleeve 7 that the clutch sleeve is actuated through an intermediate drum and slid in the direction to produce frictional contact of the co-operating brake discs 6 which are splined, only when said sprocket wheel 9 is rotated in reversed direction for a predetermined relatively large angle, whilst when the sprocket wheel 9 is rotated in the normal direction the clutch cone sleeve 7 is held in frictional contact with the tapered face 8 of the hub shell 2. In this respect, the mechanism is substantially similar in its nature to that found in conventional bicycle hub having a coaster brake.

In the mechanism according to this invention, the intermediate drum heretofore inserted between the right hand ball bearing and the hub shell is replaced by two parts, one consisting of a stepped sleeve 10 integral with the sprocket wheel 9 and the other consisting of a planet pinion cage 11 which is connected with the clutch cone sleeve 7 by means of a male screw thread 19 and a female screw thread 20. The hub shell 2, at the right hand end, is supported by the stepped sleeve 10 through the bearing balls 12. The planet pinion cage 11, at the right hand end, is supported by the hub cone or inner race 3 through the bearing balls 13. The stepped sleeve 10 is supported by the planet pinion cage 11 through the bearing balls 14. The hub cone 3 is provided with a sun gear 15 meshing with planet pinions 17 which, in turn, mesh with an internal gear 16 provided on the inner wall of the stepped sleeve 10, so that upon the normal rotation of the sprocket wheel 9 power is transmitted at a reduced speed ratio through the internal gear 16 and the planet pinions 17, whereby the clutch cone sleeve 7 is moved toward the tapered clutch face 8 on the hub shell through the spiral engagement of the male screw thread 19 on the left hand extension 18 of the planet pinion cage 11 with the female screw thread 20 on the clutch cone sleeve 7.

In the hub shell 2, at the right hand end portion, there is provided an internal ratchet wheel 21. A plurality of change-over pawls 22 pivotally mounted on the stepped sleeve 10 and are biassed by springs 23 in engagement with the ratchet wheel 21. Insofar as said change-over pawls 22 are held in engagement with the ratchet wheel 21, power is transmitted from the sprocket wheel 9 to the hub shell 2 at the same speed as the sprocket, i.e. at relatively high speed, without being affected by the speed reducing mechanism comprising the above mentioned planet pinions 17 and the clutch cone sleeve 7. It will be noted that the change-over of the reduced speed obtained through the clutch sleeve 7 and the normal high speed obtained through the engagement of the pawls 22 is effected by the reverse rotation of the sprocket wheel 9 for a predetermined range of angle which is smaller than the angle required for braking. For this purpose, within the right hand portion of the hub shell there is provided an annular pawl shifter cage 27 having an extension or boss of reduced diameter which is mounted on the boss 28 of the clutch cone sleeve 7. In the right hand cylindrical portion of the shifter cage 27, there are provided a plurality of first axial recesses 24 having circumferentially greater width and a plurality of second axial recesses 25 having circumferentially lesser width, said first and second recesses 24 and 25 being alternately arranged circumferentially at predetermined interval. Each wide recess 24 has a tapered tongue 26 protruding inwardly, leaving a relatively narrow passage 26'. Said shifter cage 27 is so arranged as to surround the change-over pawls 22, the latter being received in the wide recesses 24 and held engaged with the ratchet wheel 21, as shown in FIGURES 1 and 3, and it is to be understood that when the stepped sleeve 10 is partially rotated in the reverse direction for an angle substantially corresponding to the distance between the wide recess 24 and the narrow recess 25 the free end of each pawl 22 is caught by the narrow recess 25, thereby each pawl is held in the disengaged position as shown in FIGURES 6 and 7. This is accomplished by the provision of special means about to be described.

The left hand reduced diameter portion of the shifter cage 27 is mounted on the boss 28 of the clutch cone sleeve 7, with resilient bent pawls 29 integrally formed in the reduced diameter portion normally engaged with a saw toothed rim of the boss 28 of the clutch cone sleeve 7, thereby preventing the reverse rotation of the shifter cage 27 relative to the boss 28, so that during the normal rotation of the sprocket wheel 9 the shifter cage 27 is rotated in unison with the stepped sleeve 10. On the other hand, upon reversed rotation of the sprocket wheel 9 the stepped sleeve 10 carrying the pawls 22 may be rotated in reverse direction relative to the shifter cage 27, so that low speed power transmission position is obtained.

When actuating the brake discs 6, it is necessary to discontinue the power transmission. At the time of low speed power transmission, this is accomplished by simply forming the narrow recesses 25 in the shifter cage 27 longer toward the right, so that the same can continue to catch the change-over pawls 22 in their position disengaged from the internal ratchet wheel 21 in spite of the axial movement of the clutch cone sleeve 7 toward the left. However, at the time of normal high speed power transmission where the pawls 22 are held in engagement with the internal ratchet wheel 21, cut off of the power transmission during the braking action must be effected by different means. For such purpose, the boss 28 of the clutch cone sleeve 7 is provided with a resilient ring 31, so that the shifter cage 27 may be moved toward the left in unison with the clutch sleeve 7. Upon the leftward axial movement of the shifter cage 27, pawls 22 are actuated by the tapered tongues 26 and are moved inwardly and held disengaged from the internal ratchet wheel 21.

It is to be understood that it is necessary to allow the limited axial movement of the clutch cone sleeve 7 according to the rotation of the cylindrical extension 18 of the planet pinion case 11 without actuating a pressure ring 32 for the brake discs 6. For this purpose, the left hand end portion of the clutch cone sleeve 7 is provided with split recesses 33. The pressure ring 32 is formed of an annular groove 34, wherein is mounted a substantially annular elasting ring 36 having radial ribs 35 which are inserted in said split recesses 33 in the clutch cone sleeve 7, whereby the clutch cone sleeve 7 may slide axially toward the left for a predetermined extent without affecting the brake discs 6.

As will be seen from the foregoing, according to this invention, a planet gear transmission mechanism may be arranged in a space left within the hub shell at the right hand portion thereof and is so arranged as to obtain a low speed power transmission, and by providing the change-over pawls engaging with the internal ratchet wheel the high speed power transmission is also obtained, and the speed change may be readily effected by operating said power transmission mechanism in the reversed direction for a limited angle smaller than the angle required for braking, yet enabling to actuate the brake by the reversed operation of the power transmission mechanism for a larger angle of rotation. Such mechanism may be built-in without substantially increasing the size of the conventional bicycle hub having a coaster brake system.

What I claim is:

1. In a bicycle hub having a clutch actuated from a sprocket wheel through a power transmission mechanism by axial movement, a combination comprising a hub shell having an internal ratchet wheel and an internal tapered clutch face, a sprocket wheel having a cylindrical extension supporting one end of said hub shell and having an internal gear, a plurality of change-over pawls pivotally mounted in said extension of the sprocket wheel and adapted to engage with said internal ratchet wheel on the hub shell, a fixed hub cone having a sun gear, a planet pinion cage arranged between said fixed hub cone and the cylindrical extension of the sprocket wheel and having a screw threaded extension, a plurality of planet pinions carried by said planet pinion cage and meshing with said sun gear on the fixed hub cone and with the internal gear on the sprocket wheel extension, a clutch cone sleeve connected with said screw threaded portion of the cylindrical extension of said planet pinion cage and adapted to be axially moved upon rotation of the planet pinion cage to be moved into or out of frictional contact with said tapered clutch face on the hub shell, and a cylindrical shifter cage mounted on said clutch cone sleeve and having a plurality of first axial recesses having circumferentially larger width and a plurality of second axial recesses having circumferentially lesser width, said first and second recesses being alternately arranged circumferentially at intervals, and each first recess receiving said change-over pawl allowing the latter to engage with the internal ratchet wheel formed on the hub shell and each second recess preventing the engagement of the change-over pawl with the said internal ratchet wheel.

2. A bicycle hub as recited in claim 1, wherein a plurality of brake discs are provided which are actuated by axial movement of the clutch sleeve when the clutch sleeve is disengaged by reverse rotation of the sprocket wheel for an angle greater than the angle of rotation required for changing speed.

References Cited in the file of this patent

UNITED STATES PATENTS

| | | |
|---|---|---|
| 2,143,798 | Ribe | Jan. 10, 1939 |
| 2,993,575 | Hood | July 25, 1961 |